Figure 1:
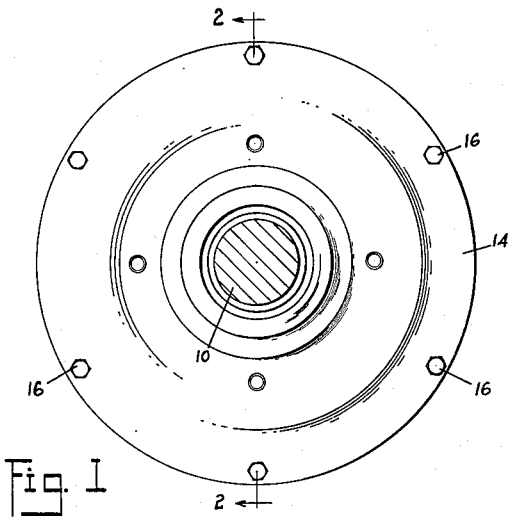

Dec. 26, 1961  R. L. JAESCHKE  3,014,566
MAGNETIC COUPLING

Filed Sept. 28, 1959  2 Sheets-Sheet 1

INVENTOR.
RALPH L. JAESCHKE
BY
Teare, Kramer, Sturges & Fetzer
ATTORNEYS

Dec. 26, 1961  R. L. JAESCHKE  3,014,566
MAGNETIC COUPLING
Filed Sept. 28, 1959  2 Sheets-Sheet 2
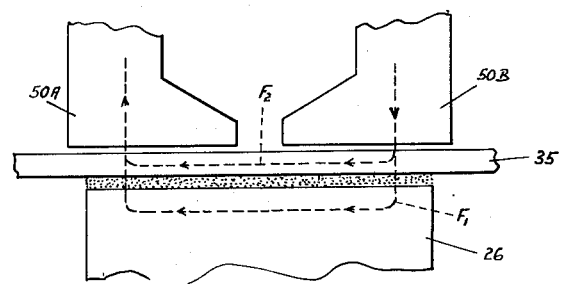
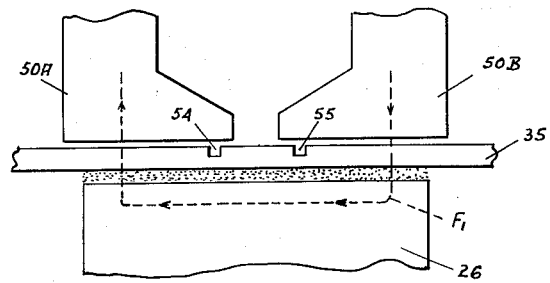
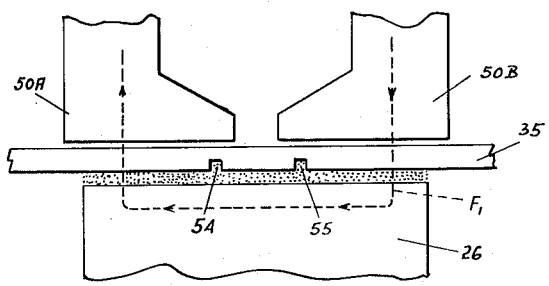
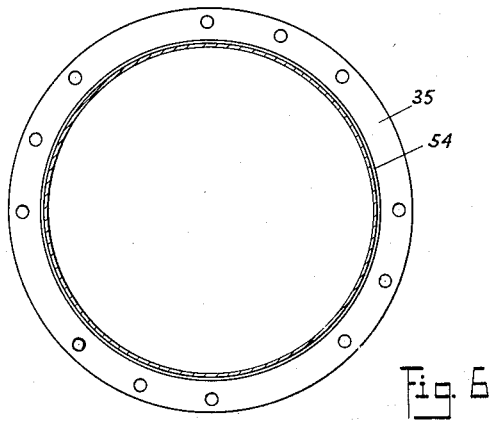
INVENTOR.
RALPH L. JAESCHKE
BY
Teare, Kramer, Sturges & Fetzer
ATTORNEYS

United States Patent Office 3,014,566
Patented Dec. 26, 1961

3,014,566
MAGNETIC COUPLING
Ralph L. Jaeschke, Kenosha, Wis., assignor to Eaton Manufacturing Company, Cleveland, Ohio, a corporation of Ohio
Filed Sept. 28, 1959, Ser. No. 842,876
1 Claim. (Cl. 192—21.5)

This invention relates generally to magnetic couplings between relatively rotatable driving and driven members in a power transmitting system and more particularly relates to improvements for increasing the torque transmitted between the members when their relative disposition in the main magnetic circuit detracts from the optimum transmission of effective magnetic flux through such circuit.

Such power transmitting systems may be of the eddy current type or of the magnetic particle type. In the former, one of the members is provided with magnetic poles which are magnetized by an energized field member and the magnetic path between the poles is completed through the other member. This reaction generates localized eddy currents therein which in turn develop a second magnetic field, its strength determined by the relative speed between the driving member and the driven member plus the strength of the energized field; torque being transmitted by the magnetic attraction and repulsion between the magnetized poles and the eddy current field. In the magnetic particle type of coupling, torque is transmitted through magnetic particles in an air gap between adjacent magnetic working surfaces of the members when the particles are acted upon by a magnetic field; the magnetic particles may be suspended in either wet or dry lubricants or may be utilized in the absence of lubricants.

In either of the foregoing types of couplings, if the energized field coil is carried directly by one of the members, there is only one magnetic flux path linking the polarized portions of the magnetic circuit. However, where the field coil is mounted on a stationary core adjacent one of the members, such adjacent member introduces a shunt path between the stationary core and the other member which reduces the effective flux linkage with such other member and decreases the efficiency of torque transmission. While various attempts have been made to minimize this shunting effect, such as the introduction of a nonmagnetic barrier in the shunt path formed by the adjacent member, such attempts have not been entirely satisfactory because they have resulted in a more complex mechanical structure having less mechanical strength and at a greater cost.

Hence, it is a principal object of this invention to increase the effective flux linkage between two relatively rotatable torque transmitting members having a magnetic coupling generated by a stationary field member.

Another object of this invention is to increase the efficiency of torque transmission between a relatively rotatable driving and driven member which are magnetically coupled together through a magnetic field generated by a stationary field member.

A still further object of this invention is to minimize in a simple and economical manner the shunting effect of one of two relatively rotatable torque transmitting members which are magnetically coupled through a magnetic field generated by a stationary field member.

Although, as hereinbefore noted, this invention is equally applicable to either the eddy current or magnetic particle type coupling, for exemplary purposes it will be primarily described in its preferred embodiment as applied to the magnetic particle type coupling. Thus, briefly, in accordance with this invention as applied to a magnetic particle type coupling, there is provided a rotatable outer member in the form of a hollow cylindrical drum concentrically disposed about an inner relatively rotatable member or rotor and defining an air gap therebetween having magnetic particles disposed therein. The magnetic field is generated by a field coil mounted on a magnetic core disposed in fixed concentric relation about the drum and coacting to form the field member. The magnetic core preferably has a channel-shaped cross section with the channel legs forming radially projecting portions spaced axially from each other along the drum to provide opposite magnetic poles. When the core is magnetized upon the instance of energization of the field coil, the flux traverses a main series magnetic circuit across the air gap between the drum and rotor and creates a torque transmitting bond through the magnetic particles in the gap.

In order to reduce the shunting effect of the drum in the main series magnetic circuit, the drum is reduced in cross section locally within the axial confines of each of the magnetic poles by one or more grooves to provide a localized magnetic isthmus. The reduced cross section of the drum must be of lesser dimension at its upper limit than the least cross-section across any portion of the main series magnetic circuit and is only limited by mechanical strength at its lower limit. This results in saturation of the magnetic isthmus created at each of the reduced cross sectional portions of the drum which effectively reduces the shunting effect of the drum and increases the effective flux linkage between the drum and the rotor for increased transmission of torque therebetween. A similar arrangement can be employed to concentrate the effective flux in the pole portions of the rotor member of an eddy current type coupling when the magnetic field is generated by a stationary field member adjacent the rotor.

Figure 2:
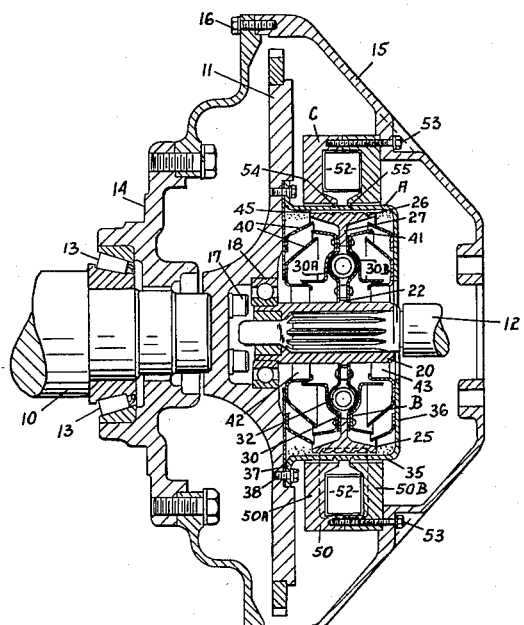

In the drawings:

FIG. 1 is an end view of a power transmitting mechanism embodying a magnetic coupling having the features of this invention;

FIG. 2 is a sectional view of the power transmitting mechanism taken along the lines 2—2 of FIG. 1 and showing in greater detail the operative components of the magnetic coupling therein; and FIGS. 3, 4 and 5 are diagrammatic drawings of a portion of the magnetic circuit through one typical section of the coupling illustrating respectively the magnetic paths without the magnetic isthmus and with alternative forms of the magnetic isthmus; and FIG. 6 is a sectional view of the drum taken along a plane through one of the grooves transverse to the axis of rotation to show the cross-sectional configuration of the magnetic isthmus formed by the groove.

Referring now more particularly to FIG. 2 of the drawings, the sectional view illustrates for exemplary purposes the mechanical assembly of the basic components of a magnetic particle type coupling. These basic components are essentially a driving member in the form of a drum assembly A and a driven member in the form of a rotor assembly B, each of which are concentrically disposed for relative rotation, and a field assembly C consisting of a stationary member forming a magnetic core concentrically surrounding the rotatable drum and rotor assemblies and carrying a toroidal field coil therein.

In the preferred form shown in the sectional view of FIG. 2, the mechanism also includes the output shaft 10 of a prime mover and the input shaft 12 for a suitable load. The driving shaft 10 is journaled in a bearing 13 mounted in one end wall 14 of an enclosing housing while the driven shaft 12 may likewise be journaled in suitable bearings (not shown) in another end wall 15 of the enclosing housing. The end walls 14 and 15 when connected at their periphery through suitable studs 16 form a hollow chamber in which are disposed the operative assemblies A, B and C which couple the driving and driven shafts together in driving relation in a manner to be hereinafter more fully described.

A conventional starter gear ring 11 is secured on the driving shaft by suitable means 17 and is also supported in concentric coaxial relation with respect to the driven shaft 12 by means of a suitable roller bearing 18 mounted at the adjacent extremity of the driven shaft 12. A suitable sleeve 20 is splined on the driven shaft 12, and, in addition to supporting the roller bearing 18, is provided with an intermediate flange 22 forming an annular supporting ring for the rotor assembly B.

The rotor assembly B includes an annular rotor member 25 having a relatively wide rim 26 integrally formed on a narrow hub portion 27 which is in turn operably supported between one end of the separable walls 30A and 30B of a cage assembly 30. The cage assembly 30 encloses a conventional vibration damper which utilizes annularly disposed coil springs 32 in a manner well known to those skilled in the art. The other ends of the separable cage walls 30A and 30B are secured to the intermediate flange 22 on the sleeve 20.

In the exemplary form of the magnetic particle clutch illustrated in the drawings, the rotor assembly B is enclosed by the drum assembly A which includes a drum member 35 having one end wall 36 forming an enclosing hub and a reversely extending flange 37 at the other end of which is secured to the starter gear ring 16 by means of suitable bolts 38. An annular plate 39, which is also secured to the starter gear ring 11 by the same bolts 38, forms the other enclosing end wall of the drum assembly. The space between the cylindrical wall portion of the drum member 35 and the outer periphery of the rotor member 25 defines a working air gap in which a large number or a mass of finely divided relatively movable contiguous discrete magnetic particles, such as soft iron particles, are suspended in either a wet or dry lubricant. Each of the end walls 36 and 39 forming the enclosing hub portions of the drum assembly have secured on their internal wall surfaces a plurality of baffle members 41 mounted on the cage assembly 30 to provide chevron-type seals against the escape of the magnetic particle mixture from the drum chamber. Additional seals or packing may be provided on the sleeve 20 at 42 and 43 as shown in the drawings.

Thus, it is readily apparent from the foregoing when taken in reference to the drawings that the rotor assembly B is carried for rotation on the driven shaft 12 while the drum assembly A is carried for rotation on the driving shaft 10. Driving torque is transmitted from the driving shaft 10 through the drum assembly A to the rotor assembly B and driven shaft 12 by setting up a magnetic field linking the adjacent working surfaces of the drum 35 and the rotor 25 through the magnetic particle mixture in the air gap 45. This is accomplished by mounting the magnetic field assembly C in concentric spaced relation around the drum and rotor assemblies, but mechanically isolated therefrom. The field assembly C includes an annular core 50 having a substantially channel-shaped cross-section which supports a toroidal coil 52. The entire field assembly is mounted by means of suitable bolts 53 passing through the end wall 15 of the enclosing housing and the base of the magnetic core 50 in such manner that the legs 50A and 50B of the channel-shaped cross-section of the magnetic core are disposed adjacent the outer peripheral surface of the drum 35 and in axially spaced relation from each other along the drum wall. The coil may then be coupled to a source of electrical energy external to the housing to polarize the legs 50A and 50B with a magnetic field which passes from one leg 50A through the adjacent portion of the wall of the drum 35, thence through the magnetic particle mixture in the air gap 45, through the rotor 25 and back through the magnetic particle mixture and the wall of the drum to the other leg or pole 50B of the core as diagrammatically represented by the dotted lines. The coaction between the driving and driven components through the magnetic field linkage transmits driving torque from the driving to the driven member in a well known manner.

As hereinbefore noted, when the wall of the drum 35 is continuous between the poles 50A and 50B of the magnetic core, it tends under normal operating conditions to shunt or by-pass the magnetic flux through the drum wall between the poles. This is diagrammatically illustrated in FIG. 3 of the drawings where the main series magnetic work circuit is designated by the dotted line $F_1$ and the shunt path by the dotted line $F_2$ through the drum 35. As a consequence, increased energization of the coil is required to produce the desired torque transmission with a consequent reduction in the overall efficiency of such transmission. While attempts have been heretofore made to minimize the shunting effect of such a continuous drum wall in this type of power transmitting mechanism, none of such attempts have been entirely satisfactory because they have resulted in more complex structures and a loss of mechanical strength and are less economical to produce.

It has been determined in accordance with this invention that the shunting effect of the continuous wall portion of the drum 35 between the poles of the magnetic core 50 can be materially reduced without loss of desirable mechanical structural characteristics and without complicating the assembly by introducing a magnetic isthmus in the shunt path $F_2$ which will become saturated before the main series magnetic circuit becomes fully magnetized. This can be most economically accomplished by simply restricting the continuous drum wall in the localized areas immediately beneath the poles of the magnetic core 50 and preferably at the adjacent axial extremities of each pole as best shown in the diagrammatic illustrations in FIGS. 4 and 5 of the drawings. In the preferred form shown in FIGS. 2, 4 and 5 of the drawings, such localized restriction of the drum wall takes the form of a pair of annular grooves 54 and 55 separated axially from each other in the drum wall so that they are respectively disposed adjacent the inner axial extremity of each of the corresponding poles of the magnetic core.

In operation, the magnetic isthmus provided by each of the localized restrictions 52 and 53 acts as a choke to effectively isolate the portion of the drum wall between them from the main flux path $F_1$ because of the saturation that takes place in a reduced portion of the wall at each restriction. The effectiveness of the isolation can readily be controlled by the extent and configuration of the restrictions and any localized restriction, whether in the form of a single or multiple restriction and regardless of configuration, in the drum wall immediately adjacent and beneath each pole of the magnetic core 50 which will become saturated in normal operation to isolate the portion of the drum intermediate the poles 50A and 50B is within the scope of this invention. The upper dimensional limit on the cross-sectional area of each magnetic isthmus is that it be less than the cross-sectional area in any part of the main series magnetic circuit $F_1$. The lower dimensional limit is limited only by the mechanical strength requirements of the drum 35. I have found, however, that for optimum operation in the preferred embodiment shown the cross-sectional area of each magnetic isthmus normal to the path of flux should be less than one-tenth of the smallest cross-sectional area normal to the flux in the main series magnetic circuit. This relationship will of course vary with the size of coil and other parts of the coupling and even with the type of magnetic materials employed, but it can readily be determined for any given arrangement by application of the principle that the dimensional configuration of the magnetic isthmus must be such that it will become saturated before the remaining parts of the main magnetic circuit become fully magnetized.

Thus, I have found that I can improve the torque transmitted in the type of mechanism illustrated in the drawings by more than 5% by employing a localized restriction to form a magnetic isthmus in the manner herein shown and described, thereby minimizing the shunting effect of the continuous portion of the drum wall between the poles of the field assembly and increasing the overall efficiency of the torque transmitting mechanism without complication of structure or loss of desirable mechanical characteristics and in an economical and simple manner.

I have shown and described what I consider to be the preferred embodiment of my invention along with suggestions of modified forms, and it will be obvious to those skilled in the art that other changes and modifications may be made without departing from the scope of my invention as defined by the appended claim.

I claim:

A magnetic coupling for relatively rotatable members comprising, a magnetically susceptible outer driving member having a thin-walled hollow drum, a magnetically susceptible inner rotor member concentrically disposed within said hollow drum with its outer peripheral surface spaced radially inward from the inner peripheral surface of said drum to form an air gap therebetween, a coil and a magnetically susceptible support forming a magnetic core concentrically disposed in radially spaced relation from said drum portion, means for selectively energizing said coil to produce a predetermined magnetic field, means coacting in said air gap in response to a traversing magnetic field to link the drum and rotor together in driving relation, said magnetic core having radially projecting portions spaced from each other axially along said drum and coacting to form opposite magnetic poles upon energization of the coil, said pole portions each terminating in a confronting surface spaced radially from the adjacent confronting wall of the drum to define a second air gap, said pole portions coacting with the respective confronting wall portions of said drum and rotor to guide said predetermined magnetic field in a main path across said air gaps, the wall portion of said drum disposed intermediate said pole portions providing a shunt path for said predetermined magnetic field, each confronting wall portion of the drum having a substantially reduced cross section integrally joined to said intermediate wall portion of the drum, said reduced cross sections of the drum coacting to enlarge said second air gap and to restrict the shunt path in the corresponding confronting drum wall portion at the inner axial extremity of each pole portion respectively, each reduced cross section of the drum having a predetermined dimensional configuration providing a radial dimension for the enlarged portion of the second air gap greater than the radial dimension of the restricted shunt path for coaction to limit the flux therethrough and thereby increase the effective flux linkage across the air gaps in the main magnetic path.

References Cited in the file of this patent

UNITED STATES PATENTS

| 2,799,876 | Finn et al. | July 23, 1957 |
| 2,870,888 | Gill | Jan. 27, 1959 |
| 2,885,045 | Barrett | May 5, 1959 |

FOREIGN PATENTS

| 1,046,420 | Germany | Dec. 11, 1958 |